United States Patent [19]

Nakagawa et al.

[11] Patent Number: 4,459,466
[45] Date of Patent: Jul. 10, 1984

[54] DUAL AIR PASSAGE HEATING APPARATUS WITH CERAMIC HEATER ELEMENT

[75] Inventors: Mitsuru Nakagawa, Chiryu; Yasuo Kondo; Atsushi Hashikawa, both of Okazaki, all of Japan

[73] Assignee: Nippon Soken, Inc., Nishio, Japan

[21] Appl. No.: 323,098

[22] Filed: Nov. 19, 1981

[30] Foreign Application Priority Data

| Nov. 26, 1980 [JP] | Japan | 55-166118 |
|---|---|---|
| Feb. 3, 1981 [JP] | Japan | 56-13745 |
| Feb. 3, 1981 [JP] | Japan | 56-13217 |

[51] Int. Cl.³ .............. B60L 1/02; F24H 3/04; F28F 27/02; H05B 3/04
[52] U.S. Cl. ..................... 219/367; 165/96; 165/103; 219/202; 219/374; 219/505
[58] Field of Search ........... 219/367, 364, 504, 505, 219/374; 165/97, 100, 102, 103, 42; 237/12.3 R, 12.3 A; 98/2.11

[56] References Cited

U.S. PATENT DOCUMENTS

| 1,650,872 | 11/1927 | Hulsmeyer | 165/97 |
|---|---|---|---|
| 1,785,334 | 12/1930 | Black | 165/97 |
| 2,716,021 | 8/1955 | Evans et al. | 165/97 |
| 3,215,195 | 11/1965 | Treplin | 165/103 |
| 3,367,413 | 2/1968 | Forster | 165/97 |
| 3,390,719 | 7/1968 | McCallister | 165/97 |
| 3,517,162 | 6/1970 | Webb | 219/364 |
| 3,666,924 | 5/1972 | Jensen et al. | 219/552 |
| 3,719,796 | 3/1973 | Abildtrup | 219/504 |
| 3,737,622 | 6/1973 | Hallgreen | 219/364 |
| 4,064,934 | 12/1977 | Kolthoff, Jr. et al. | 165/97 |
| 4,232,211 | 11/1980 | Hill | 219/202 |
| 4,316,077 | 2/1982 | Carlson | 219/367 |
| 4,337,821 | 7/1982 | Saito | 237/12.3 A |
| 4,346,285 | 8/1982 | Nakamura et al. | 219/505 |
| 4,356,965 | 11/1982 | Matsushima et al. | 165/42 |
| 4,406,214 | 9/1983 | Sakurai | 237/12.3 A |

FOREIGN PATENT DOCUMENTS 7609636 3/1977 Netherlands .................. 219/505

Primary Examiner—Roy N. Envall, Jr.
Assistant Examiner—Geoff Evans
Attorney, Agent, or Firm—Kenyon & Kenyon

[57] ABSTRACT

An air heating apparatus comprises an auxillary PTC heating element in an air duct lying parallel to the length of the duct to define first and second air passages separated by the heating element. The PTC heating element has apertures through which passes air to be heated; the two air passages thereby communicating with each other by means of the apertures through the heating element. First and second valves are located at upstream and downstream ends of the first and second air passages for selectably closing and opening the upstream and downstream ends of the first and second air passages, respectively.

8 Claims, 8 Drawing Figures

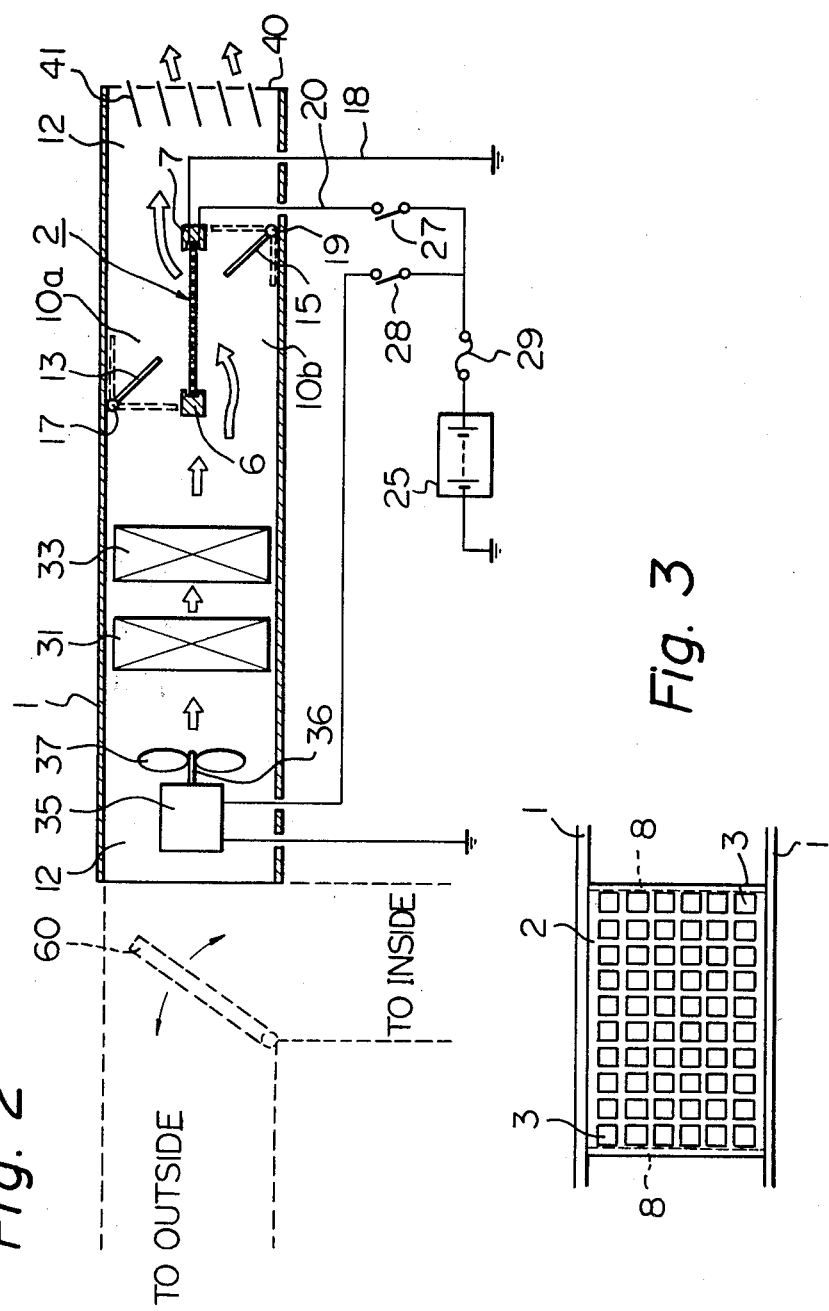

DUAL AIR PASSAGE HEATING APPARATUS WITH CERAMIC HEATER ELEMENT

BACKGROUND OF THE INVENTION

This invention relates to an air heating apparatus for automobiles or for domestic use.

There is known an air heating apparatus, for example, as disclosed in Japanese Patent Application Laid Open No. 55-68413, in which a positive temperature coefficient ceramic heating element (PTC heater) which has a number of apertures therethrough is rotatably arranged in a duct so that when no heating is necessary, the PTC heater is brought into an inoperative position in which it comes out of the air passage of the duct. Otherwise, the PTC heater would be an obstacle to the air passing through the duct. In order to make it possible to rotate the PTC heater between an operative position in which it is exposed to the air flow in the duct and the inoperative position, it is necessary to provide, on a rotating shaft of the PTC heater, electrical slide contacts, such as slip rings, for feeding electrical power to the PTC heater. Furthermore, the PTC heater requires a relatively large electrical current and, accordingly, a large power loss occurs at the slide contacts since the power loss is a function of the square of the current. In addition, the repeated rotational movement of the PTC heater results in wear of the slide contacts.

It is also necessary to use flexible conductors connected to the PTC heater so that the conductors can follow the rotational movement of the PTC heater. However, such flexible conductors tend to break, resulting in a decrease in the service life of the apparatus.

Alternatively, there is also known an air heating apparatus including an immovable PTC heater which is located across and in a duct. However, this type of known apparatus requires the provision of a by-pass passage which bypasses the PTC heater and which has a valve at its inlet end. The valve closes the by-pass passage when heating is necessary, so that air flows through the PTC heater. The valve closes the main duct when no heating is necessary, so that air flows in the by-pass passage. In order to obtain a large amount of hot air, the diameter of the PTC heater which is usually of circular disc shape is required to be increased, which results in an increase of the diameter of the duct.

The primary object of the present invention is to eliminate the above mentioned drawbacks of prior art apparatuses, by providing a hot-air heating apparatus which has a heating element located in and parallel with a duct and control valves which are located at upstream and downstream sides of the heating element to control the amount and direction of air passing therethrough.

SUMMARY OF THE INVENTION

According to the present invention, since the heating element is not rotated and is immovable, no sliding contacts, such as slip rings for feeding electrical current to the heating element are necessary and, accordingly, the disadvantages raised by the provision of the sliding contacts, as mentioned above can be eliminated.

Furthermore, according to the present invention, since the heating element is arranged to be parallel with the duct, and not across it, the amount of hot air can be increased without increasing the size of the duct.

BRIEF DESCRIPTION OF THE DRAWINGS

Other features, additional objects, and many of the attendant advantages of this invention will readily be appreciated as the same becomes better understood by reference to the following detailed description of preferred embodiments when considered in connection with the appended drawings in which:

FIG. 2 is a cross-sectional and schematic side view of a hot-air heating apparatus incorporated into an automobile, FIG. 3 is a front-elevational view of a heating element.

DETAILED DESCRIPTION

Figure 1:
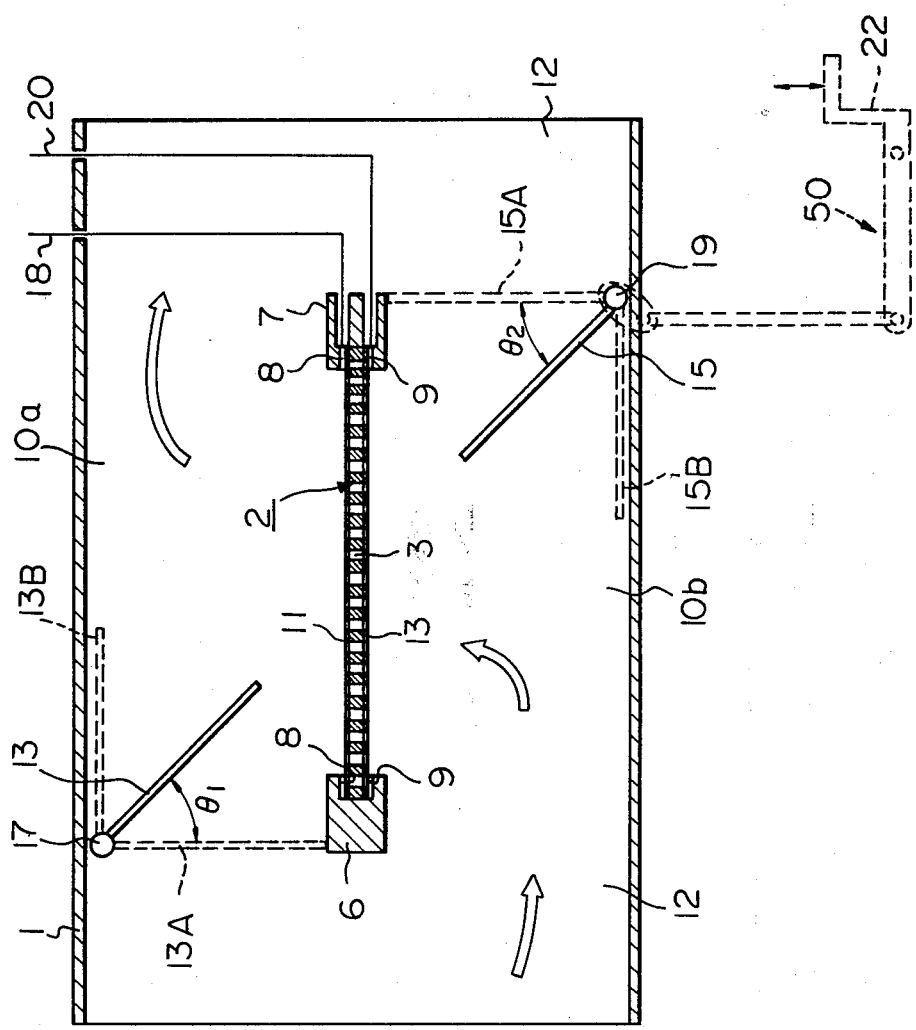
FIG. 1 is a cross-sectional side view of a hot-air heating apparatus according to one embodiment of the present invention.

In FIGS. 1 and 2, a heating element 2 which is made of a rectangular plate is arranged in a rectangular duct 1, in such a way that the heating element 2 lies in a plane at the center of and parallel with the length of the duct 1. The element 2 is a held by insulation supports 6 and 7 which are in turn secured to the inner wall of the duct 1 by means of set screws (not shown). The element 2 has a number of through-holes 3, as shown in FIG. 3. The element 2 has a resistance characteristic of positive temperature coefficiency in which the resistance suddenly increases at a predetermined temperature. For example, PTC ceramic of barium titanate type can be used for the heating element 2. The element 2 has upper and lower conductive layers 11 and 14. The opposite ends of the conductive layers are provided with upper and lower electrical lead plates 8 and 9 which are electrically connected to the upper and lower conductive layers 11 and 14, respectively. The heating element 2 is held, together with the lead plates 8 and 9, by and in the insulation supports 6 and 7.

The heating element 2 separates an air passage 12 into first and second air passages 10a and 10b, so that an operator (driver) can manually actuate the valves 13 and 15. At upstream and downstream ends of the first and second air passage 10a and 10b are provided movable valves 13 and 15 which are each attached at respective ends thereof to an associated one of shafts 17 and 19 which are in turn rotatably supported by the duct 1. The free ends of valves 13 and 15 are substantially in contact with the insulation supports 6 and 7, at their closed positions as represented by the numerals 13A and 15A, respectively, to close one end of the air passages 10a and 10b. The valves 13 and 15 rotate between their closed positions 13A, 15A and their full open positions 13B, 15B, respectively. The valves 13 and 15 can be manually operated. In an automotive embodiment of the invention, the shafts 17 and 19 extend, at their one end, out of the duct 1 and the projecting ends (not shown) of the shafts 17 and 19 can be connected to actuation levers 22 provided on an instrument panel (not shown) near the driver's seat of the automobile by means of linkages 50 (only one of linkages for the valve 15 is illustrated).

One of the lead plates 8 and 9, for example, the lead plate 8, is grounded by means of a wire 18, and the other lead plate 9 is connected to a power supply, such as a battery 25, by means of a wire 20 (FIG. 2), so that the heating element 2 can be heated. The numerals 27 and 29 designate a switching element and a safety fuse, respectively. The heating element 2 has a number of through-holes 3 (FIG. 3) which may be of any shape (e.g. rectangular, circular, etc), so that air passes through the through-holes 3.

Upstream of the heating element 2 in the duct 1, a blower device is arranged, which includes a motor 35 and a fan 37 connected to a drive shaft 36 of the motor 35. The motor 35 is connected to the power supply 25 through a switching element 28 and the fuse 29. Downstream of the blower device in duct 1 is arranged a cooling heat exchanger 31 and a heating heat exchanger 33 which can effectively utilize the engine coolant of the automobile.

On an outlet end 41 of the duct 1 is provided a grill or louver 41 which is, for example, located in the dashboard (not shown) of an automobile and which opens into a compartment of the automobile. The other end of the duct 1 is selectively connected to the outside of the automobile and the inside thereof by means of a switching valve 60. That is, fresh air outside the automobile or air inside the automobile can be selectively introduced into the duct 1.

The apparatus illustrated in FIGS. 1 and 2 operates as follows:

When no heating can be effected by the heating heat exchanger 33 because of a low temperature engine coolant, for example, during warming up the engine of the automobile, the switches 27 and 28 are closed so that they are connected to the battery 25. Consequently, the heating element 2 is heated and the motor 35 drives to rotate the fan 37. On the other hand, the valves 13 and 15 are brought into their closed positions 13A and 15A, respectively. All of the air fed from the fan 37 flows in the main air passage 12 and then in the second air passage 10b, because the inlet of the first air passage 10a is closed by the valve 13. Then, the air passes through the through-holes 3 of the heating element 2 and comes into the first air passage 10a. When the air passes through the heating element 2, the air can be heated by the heating element 2. The heated air flows out from the louver 41 into a compartment of an automobile to warm the compartment. The direction of the flow of the heated air discharged from the louver 41 can be adjusted by the louver 41 which has, as is well known, adjustable inclined wings. The temperature of the heated air to be fed from the apparatus can be controlled by adjusting angle positions of the valves 13 and 15. That is, the amount of cool air which does not pass the heating element 2 and which directly comes into the first air passage 10a through the valve 13 depends on the angle $\theta_1$ of the first valve 13 and the amount of cool air which flows through the second valve 15 without passing through the heating element 2 depends on the angle $\theta_2$ of the second valve 15.

When no heating is necessary, the switch 17 is made OFF to cut off the electric power fed to the heating element 2 and the valves 13 and 15 are brought into their open positions 13B and 15B, respectively to decrease the flow resistance due to the valves 13 and 15, so that a relatively low temperature fresh air can be introduced into the compartment of the automobile from the outside through the duct 1 by means of the fan 37.

When the temperature of the engine coolant becomes high, the switch 27 is turned OFF to make the heat element inoperative, so that heated air warmed by the heating heat exchanger 38 can be discharged from the apparatus into the automobile, without the use of the heat element 2.

Also when cooling is necessary, the two valves 13 and 15 are brought into their open positions 13B and 15B, so that cool air cooled by the cooling heat exchanger 31 flows through the first and second air passages 10a and 10b.

According to the present invention, since the heating element 2 is located in and parallel to the duct 1, it is possible to make the heating element larger in order to obtain a large amount of hot or cool air without increasing the size of the duct.

Figure 4:
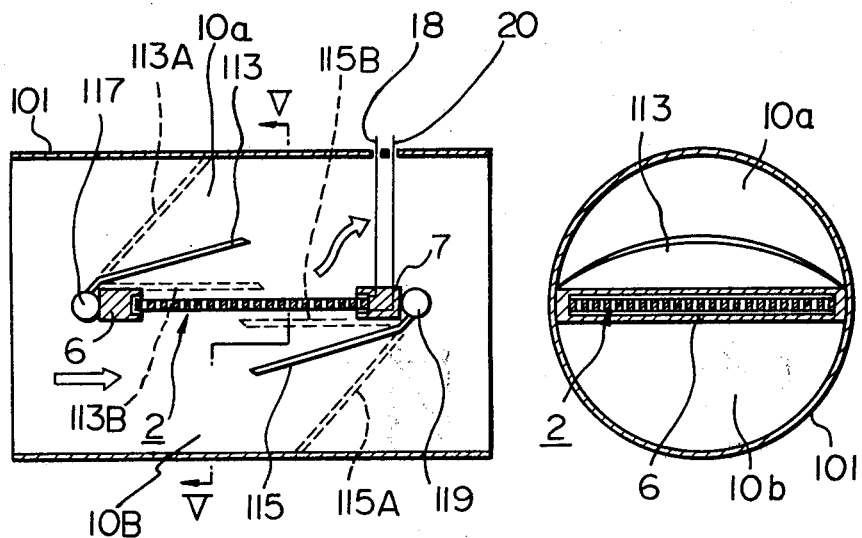
FIG. 4 is a cross-sectional side view of a hot-air heating apparatus according to a second embodiment of the present invention.
Figure 5:
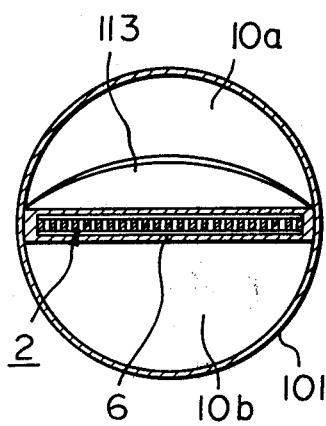
FIG. 5 is a cross-sectional view taken along the line V—V in FIG. 4.

FIGS. 4 and 5 illustrate another embodiment of the present invention, in which the square pillar shaped duct 1 of FIG. 1 is replaced by a cylindrical duct 101 and the rectangular plate-like movable valves 13 and 15 are replaced by semi-circular plate-like movable valves 113 and 115. The shafts 117 and 119 are located adjacent to the insulation supports 6 and 7. The valves 113 and 115 move between their open positions 113B and 115B and their closed positions 113A and 115A. In the closed positions, the front or free ends of the valves 113 and 115 come into contact with the inner wall of the duct 101.

The operation of the apparatus shown in FIGS. 4 and 5 is the same as that of the apparatus shown in FIGS. 1 and 2.

Figure 6:
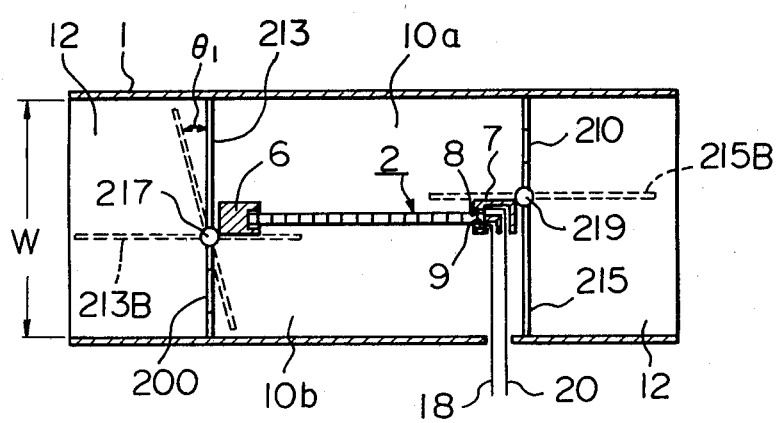
FIG. 6 is a cross-sectional side view of a hot-air heating apparatus according to a third embodiment of the present invention.

FIG. 6 shows a third embodiment of the present invention, in which the two movable valves 13 and 15 in FIGS. 1 and 2 are replaced by two movable valves 213 and 215. The valves 213 and 215 extend by the width W of the duct 1 so that when they are in their closed positions the valves 213 and 215 completely close the air passage 12 except for restriction openings 200 and 210 which will be explained hereinafter. The valves 213 and 215 are mounted to shafts 217 and 219 which are located in the vicinity of the insulation supports 6 and 7 and which are rotatably supported by the duct 1.

The first valve 213 has the first restriction opening 200 which is located on the side of the second air passage 10b, and the second valve 215 has the second restriction opening 210 which is located on the side of the first air passage 10a. That is, even when the valves 213 and 215 are in their closed positions, the first and second air passages 10a and 10b communicate with the main duct 12 through the restriction openings 210 and 200, respectively.

In this embodiment illustrated in FIG. 6, when heating (or cooling) is necessary, the valves 213 and 215 are brought into their closed positions. The air created by the fan 37 (FIG. 2) passes through the opening 200 of the valve 213 and comes into the second air passage 10b. The air, then, passes through the through-holes 3 of the heating element 2 and comes into the first air passage 10a. The hot air heated by the heating element 2 passes through the opening 210 of the valve 215 and blows out from the louver 41 (FIG. 2).

When the air passes through the opening 210, the velocity of the air flow increases, which results in an increase in the distance of displacement of the air, i.e. the reach of the hot air discharged from the apparatus.

Figure 7:
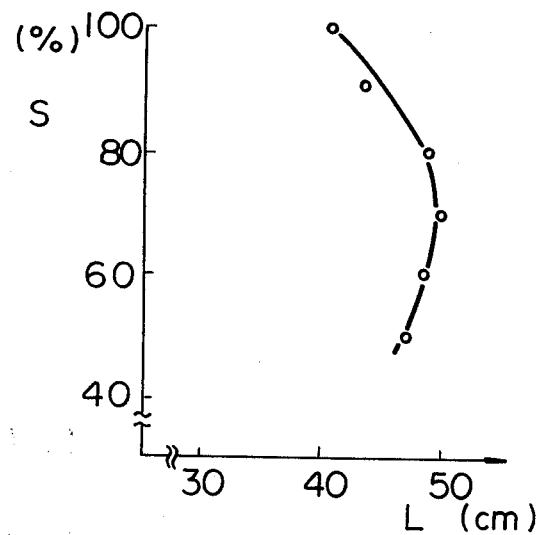
FIG. 7 is a diagram illustrating a characteristic on the reach of hot air emitted from the apparatus, and, FIG. 8 is a cross-sectional side view of a hot-air heating apparatus according to a fourth embodiment of the present invention.

The inventors experimentally tried to establish a relationship between the ratio S of area of the opening 210 to the area of the upper half of the valve 215 located above the shaft 219 and the reach L of the hot air. FIG. 7 shows experimental results. The experiments have been effected under conditions in that the atmospheric temperature was 0° C. and the temperature of hot air passing through the opening 210 was 20° C. As can be seen from FIG. 7, the reach becomes small when the ratio S is increased. Because, when the ratio S is large, that is when the area of the opening 210 is large, the velocity of the hot air is small and accordingly the hot air rises due to the difference in temperature between the hot air and the atmosphere. When the ratio S is small, the velocity increases but cool air in the atomosphere tends to be pulled into the hot air. The in-pulled cool air serves as a resistance of the movement of the hot air.

According to the embodiment shown in FIG. 6, the reach of the hot air can be thus increased.

In the embodiment shown in FIG. 6, when hot air produced by the heating heat exchanger 33 (FIG. 2) is used without passing through the heating element 2, the valves 213 and 215 can be brought into their open positions 213B and 215B.

In order to increase the coefficient of heat exchange of the heating element 2, the latter should have a large number of through-holes 3 having a diameter as small as possible to increase the internal surface area with the through-holes. However, through-holes having a small diameter tend to become clogged with foreign substances, such as dust which sticks thereto. If the direction of the air flow passing through the heat element can be alternately changed, the possibility of clogging of the through-holes can be decreased. This can be solved by an embodiment shown in FIG. 8 in which the direction of the air passing through the heating element can be switched. In the embodiment shown in FIG. 8, movable valves 313 and 315 which are attached to rotatable shafts 317 and 319 supported by the duct 1 can rotate between first and second closed positions, respectively. When the movable valves 313 and 315 are in their first closed positions 313A and 315A, the valve 313 closes only the second air passage 10b and the valve 315 closes only the first air passage 10a, so that the air flows through the heating element 2 from the first air passage 10a toward the second air passage 10b, as designated by an arrow $X_1$. On the other hand, when the valves 313 and 315 are in their second closed positions 313C and 315C, the valve 313 closes only the first air passage 10a and the valve 315 closes only the second air passage 10b, so that air flows from the second air passage 10b toward the first air passage 10a, as designated by an arrow $X_2$ which is opposite to the arrow $X_1$. The numerals 313B and 315B designate full open positons of the valves 313 and 315, respectively.

Figure 8:
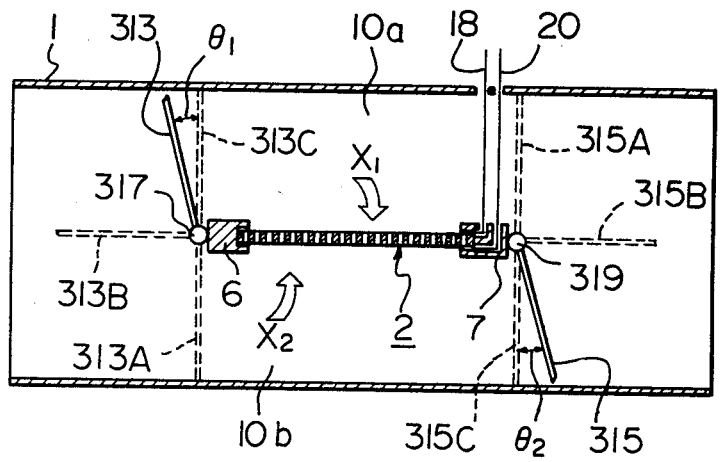

According to the embodiment shown in FIG. 8, by selectively changing the position of the two valves 313 and 315, the direction of air passing through the heating element 2 can be reversed, whereby the possibility of the through-holes 3 of the heating element 2 being clogged with dust or the like can be decreased. Accordingly, the diameter of the through-holes can be decreased to increase the area of the through-holes, thereby increasing the coefficient of heat exchange of the heating element.

In the embodiments mentioned above, the internal cross-sectional shape or profile of the duct is not limited to either a circle or a rectangle, but may be of any shape.

Although the two valves 13 and 15 (113 and 115, 213 and 215, 313 and 315) are preferably actuated together by a common lever, they can be actuated independently of one another by their respective actuation levers, so that the angles $\theta_1$ and $\theta_2$ of the valves can be independently adjusted to obtain an optimum temperature of hot air.

The heating element can be made of ceramic material, such as SiC, and need not be limited to the type wherein the electrical resistance suddenly increases above a predetermined temperature value.

Although the invention has been described in terms of specific embodiments and applications, persons skilled in the art, in light of this teaching, can generate additional embodiments without exceeding the scope or departing from the spirit of the claimed invention. Accordingly, it is to be understood that the drawings and descriptions in this disclosure are proffered to facilitate comprehension of the invention and should not be construed to limit the scope thereof.

We claim:

1. An air conditioning apparatus for automobiles, comprising:

an air duct for providing a main passage of air, said air duct having an air inlet opening at one end and an air outlet opening at an opposite end for conducting the air along a substantially longitudinal direction of said air duct into a compartment chamber of the automobile;

air blower means arranged in said air duct for urging the air from said inlet opening of said air duct through said main passage of air;

heat exchanging means provided in said air duct for selectably heating and cooling the air urged through said main passage of air by said air blower means;

an auxillary electrical ceramic heating element arranged in said air duct for heating the air introduced by said air blower means, said electrical ceramic heating element having a rectangular configuration defining substantially a plane having a predetermined length which is immovably arranged in said main air passage of air of said air duct and which lies substantially parallel to said longitudinal direction of said air duct and substantially centered therein to define first and second air passages having at least said predetermined length and separated from one another by said heating element, said heating element having through-holes transverse to said plane for passing the air to be heated, said first and second air passages communicating with each other substantially exclusively via said through-holes of said heating element; and first and second valves located at least at an upstream end of said first air passage and at least at a downstream end of said second air passage for selectably opening and closing said upstream end of said first air passage and said downstream end of said second air passage, respectively.

2. An apparatus according to claim 1, wherein said first valve is rotatably supported by said air duct so as to rotate between a closed position in which said first valve closes said upstream end of said first air passage and an open position in which said first valve opens said first air passage for connecting said first air passage to said main passage of air, and a second valve which is rotatably supported by said air duct so as to rotate between a closed position in which said second valve closes said downstream end of said second air passage and an open position in which said second valve opens said second air passage to connect said second air passage to said main passage of air, so that, when said first and second valves are in their closed positions, the air urged through said air duct by said air blower means flows through said hating element from said second air passage toward said first air passage.

3. An apparatus according to claim 1, wherein said first valve is located at said upstream ends of said first and second air passages and which is rotatably supported by said air duct so as to rotate between a closed position in which said first valve closes said upstream end of said first and second air passages and an open position in which said first valve opens said first and second air passages to connect said first and second air passages to said main passage of air, said first valve being provided with a first restriction opening located adjacent to a selected one of said first and second air passages to connect said selected air passage to said main passage of air, and said second valve is located at said downstream ends of said first and second air passages and which is rotatably supported by said air duct so as to rotate between a closed position in which said second valve closes said downstream ends of said first and second air passages and an open position in which said second valve opens said first and second air passages to connect the latter to said main passage of air, said second valve being provided with a second restriction opening located adjacent to the other air passage to connect the latter always to said main air passage, so that, when said first and second valves are in their closed positions, the air comes into said one of said first and second air passages through said first restriction opening, passes through said heating element into the other air passage and then comes out of the other air passage through said second restriction opening.

4. An apparatus according to claim 1, wherein said first valve is rotatably supported by said air duct so as to rotate between a first closed position in which said first valve closes only said upstream end of said first air passage and a second closed position in which said first valve closes only said upstream end of said second air passage, and said second valve is rotatably supported by said air duct so as to rotate between a first closed position in which said second valve closes only said downstream end of said second air passage, and a second closed position in which said second valve closes only said downstream end of said first air passage so that the direction of flow of the air passing through said heating element can selectably be reversed by adjusting the positions of said first and second valves.

5. An apparatus according to any one of claims 2, 3, 4, or 1, wherein said first and second valves have profiles corresponding to an inner profile of said air duct so that when said first and second valves are in their closed positions, said valves come into contact with an inner surface of said air duct having said inner profile.

6. An apparatus according to claim 1, further comprising means for actuating said first and second valves simultaneously.

7. An apparatus according to claim 1, further comprising means for actuating said first and second valves independently of one another.

8. An apparatus according to claim 1, wherein said electrical ceramic heating element comprises electrically conductive layers which are provided on respective upper and lower faces of said rectangular configuration for connecting to a power supply source.

* * * * *

UNITED STATES PATENT AND TRADEMARK OFFICE
CERTIFICATE OF CORRECTION

PATENT NO. : 4,459,466
DATED : July 10, 1984
INVENTOR(S) : Nakagawa et al.

It is certified that error appears in the above-identified patent and that said Letters Patent is hereby corrected as shown below:

In the Abstract, line 1, change "auxillary" to --auxiliary--.

Column 5, line 33, change "with" to --within--.

Column 5, line 59, change "positons" to --positions--.

Column 6, line 42, change "auxillary" to --auxiliary--.

Column 7, line 13, change "hating" to --heating--.

Signed and Sealed this

Sixth Day of November 1984

[SEAL]

Attest:

GERALD J. MOSSINGHOFF

*Attesting Officer*  *Commissioner of Patents and Trademarks*